United States Patent
Kubota et al.

(10) Patent No.: US 12,312,570 B2
(45) Date of Patent: May 27, 2025

(54) BEER-TASTE FERMENTED MALT BEVERAGE

(71) Applicant: Asahi Group Holdings, Ltd., Tokyo (JP)

(72) Inventors: Jun Kubota, Tokyo (JP); Syotaro Maekawa, Tokyo (JP)

(73) Assignee: ASAHI GROUP HOLDINGS, LTD., Tokyo (JP)

( * ) Notice: Subject to any disclaimer, the term of this patent is extended or adjusted under 35 U.S.C. 154(b) by 129 days.

(21) Appl. No.: 17/613,584

(22) PCT Filed: Oct. 9, 2020

(86) PCT No.: PCT/JP2020/038282
§ 371 (c)(1),
(2) Date: Nov. 23, 2021

(87) PCT Pub. No.: WO2021/070930
PCT Pub. Date: Apr. 15, 2021

(65) Prior Publication Data
US 2022/0235299 A1    Jul. 28, 2022

(30) Foreign Application Priority Data
Oct. 11, 2019  (JP) .................. 2019-187758

(51) Int. Cl.
| | | |
|---|---|---|
| *C12C 12/04* | (2006.01) | |
| *A23L 2/38* | (2021.01) | |
| *A23L 2/60* | (2006.01) | |
| *A23L 5/20* | (2016.01) | |
| *C12C 5/00* | (2006.01) | |
| *C12C 7/04* | (2006.01) | |

(52) U.S. Cl.
CPC .............. *C12C 12/04* (2013.01); *A23L 2/382* (2013.01); *A23L 2/60* (2013.01); *A23L 5/21* (2016.08); *C12C 5/004* (2013.01); *C12C 7/04* (2013.01)

(58) Field of Classification Search
CPC .................................. C12C 12/04; C12H 3/00
See application file for complete search history.

(56) References Cited

U.S. PATENT DOCUMENTS

| 5,384,135 A | 1/1995 | Caluwaerts |
|---|---|---|
| 2004/0101591 A1 | 5/2004 | Sato et al. |

FOREIGN PATENT DOCUMENTS

| EP | 0 523 333 | 1/1993 |
|---|---|---|
| JP | 5-68528 | 3/1993 |
| JP | 5-68529 | 3/1993 |
| JP | 2002-199873 | 7/2002 |
| JP | 2003-250503 | 9/2003 |
| JP | 2004-222572 | 8/2004 |
| JP | 2012-239460 | 12/2012 |
| JP | 2015-133924 | 7/2015 |
| JP | 2016-111962 | 6/2016 |
| JP | 2016-144412 | 8/2016 |
| JP | 2019-110831 | 7/2019 |
| WO | 2014/196265 | 12/2014 |

OTHER PUBLICATIONS

International Search Report (ISR) issued Dec. 8, 2020 in International (PCT) Application No. PCT/JP2020/038282.
European Office Action issued May 19, 2023 in corresponding European Patent Application No. 20874977.0.
International Preliminary Report on Patentability and Written Opinion of the International Searching Authority issued Apr. 12, 2022 in International (PCT) Application No. PCT/JP2020/038282, together with English translations thereof.
Communication pursuant to Rule 114(2) EPC issued Jan. 19, 2024 in corresponding European Patent Application No. 20874977.0.
Branyik et al., (2012) "A review of methods of low alcohol and alcohol free beer production", Journal of Food Engineering, 108(4), pp. 493-506.
Liguori et al., (2018) "Production of low-alcohol beverages: current status and perspectives" in Grumezescu, A. and Holban, A. (eds.) Handbook of Food Bioengineering, vol. 18, Food Processing for Increased Quality and Consumption. Cambrige, MA: Academic Press, pp. 347-382.
Montanari et al., (2009) "Production of Alcohol-Free Beer" in Preedy, V.R. (ed.) Beer in Health and Disease Prevention. Cambrige, MA: Academic Press, pp. 61-75.
Sohrabvandi et al., (2010) "Alcohol-free beer: methods of production, sensorial defects, and healthful effects", Food Reviews International, 26(4), pp. 335-352.
Office Action issued Feb. 2, 2024 in corresponding Russian Patent Application No. 2021136033, with English translation.
Ermolaeva, G.A., "Degree of fermentation of wort and beer", Beer and drinks (2003), No. 6, pp. 14-15, with English translation.
Summons to attend oral proceedings issued Sep. 30, 2024 in European Patent Application No. 20 874 977.0.
Pedro Moreira da Silva et al., "Spinning cone col. distillation," The BREWER & Distiller International, 2007, vol. 3 Issue 12, p. 28-29.
Loredana Liguori, et al., "Quality Improvement of Low Alcohol Craft Beer Produced by Evaporative Pertraction," Chemical Engineering Transactions, 2015, vol. 43, p. 13-18.
Yifang Shen, ed., Complete Book of Liquor Production Technology, Chapter VII Distillation of Traditional Liquor, China Light Industry Press, 1998, pp. 443-447, with partial English translation.
Official Notice of Third Party Observations issued Apr. 1, 2025 in European Patent Application No. 20874977.0.
Wikipedia page: Gravity (alcoholic beverage), accessed Mar. 10, 2025, (https://en.wikipedia.org/wiki/Gravity_(alcoholic_beverage)).

*Primary Examiner* — Elizabeth Gwartney
(74) *Attorney, Agent, or Firm* — Wenderoth, Lind & Ponack, L.L.P.

(57) ABSTRACT

An object of the invention is to provide a beer-taste fermented malt beverage with an alcohol concentration of less than 1% (v/v), which is excellent in robust feeling of drinking, excellent in sweetness in harmony with sourness, and has beer-like flavor. The means for solving the problems is a beer-taste fermented malt beverage containing a wort fermented liquid, having a real extract concentration of 3.5% (w/w) or more, and an alcohol concentration of less than 1% (v/v).

10 Claims, No Drawings

BEER-TASTE FERMENTED MALT BEVERAGE

CROSS-REFERENCE TO RELATED APPLICATION

This application claims benefit under Article 4 of the Paris Convention base on Japanese Patent Application No. 2019-187758 filed in Japan on Oct. 11, 2019, incorporated herein by reference in their entirety.

TECHNICAL FIELD

The present invention relates to a beer-taste fermented malt beverage, and particularly to a beer-taste fermented malt beverage with an alcohol concentration of less than 1% (v/v). As used herein, the phrase "an alcohol concentration of less than 1% (v/v)" means both containing alcohol in amounts less than 1% (v/v), and containing no alcohol. Also, the term "alcohol" means ethanol.

"Fermented malt beverage" means a beverage obtained through the process of using malt as a raw material and fermenting the same. "Beer taste" means a taste and aroma reminiscent of beer. "Beer" means a beverage obtained through the use of malt, hops, water and the like as raw materials, and fermenting these with yeast.

BACKGROUND ART

Non-alcohol beer-taste beverages sometimes are produced without undergoing an alcoholic fermentation process for the purpose of putting the non-alcohol into practice. The flavor of beer, that is a fermented product, is complicated, and that reproducing this by formulating flavoring agents is difficult. Therefore, there is still room for improvement in a non-fermented non-alcohol beer-taste beverage in terms of robust feeling of drinking that is a touchiness feeling felt in the throat, harmony between sweetness and sourness, and beer-like flavor.

On the other hand, it has been known a low-alcohol beer which is made by removing alcohol component from ordinary beer. When the alcohol component is removed from beer that is a fermented product, by leaving flavor components that has been produced during an alcoholic fermentation process, a beer-taste beverage is provided.

Patent Document 1 describes a beer-taste beverage obtained by subjecting a beer after fermentation to an alcohol-removing treatment to remove alcohol component. It describes regarding such a non-alcohol beer-like beverage, as described above, that aroma and sweetness belonging to the alcohol component are removed by removing alcohol component, and as a result, points out the problems in terms of sensory aspect of shortage in beer-like aroma, weak in sweetness, and insufficient in richness and sharpness.

Patent Document 1 attempts to solve the problem by adding predetermined amounts of malt extract component and saccharide (claim 1). However, the malt extract component has an unpleasant odor, so-called wort flavor. Therefore, the non-alcohol beer-like beverage prepared by including the malt extract component therein is inferior in palatability because an unpleasant odor is imparted along with the beer-like flavor.

Patent Document 2 describes a method for producing a low-alcohol fermented malt beverage, the method being characterized by that transglucosidase is added to maische containing malt in a preparation step, that the maische is saccharified so that the ratio of non-fermentable saccharides in the total saccharides in wort before a fermentation process is 30 to 70% by mass, and that an organic acid is added so that the pH of the final product is 3.5 to 4.4 at any of the production steps (claim 1). The obtained low-alcohol fermented malt beverage has a well-balanced taste and flavor comparable to those of ordinary beers.

However, since the low-alcohol fermented malt beverage of Patent Document 2 still has a relatively high alcohol concentration of 4% by volume or less (claim 7), then, aroma and sweetness belonging to the alcohol component have an influence on the senses thereof. The method of Patent Document 2 does not perform an alcohol-removing treatment, and does not particularly provide a beer-taste fermented malt beverage having an alcohol concentration of less than 1% (v/v).

PRIOR ART DOCUMENTS

Patent Document 1: JP 2003-250503 A
Patent Document 2: JP 2012-239460 A

SUMMARY OF INVENTION

Problems to be Solved by the Invention

The present invention solves the above-mentioned problems, and resides in providing a beer-taste fermented malt beverage with an alcohol concentration of less than 1% (v/v), which is excellent in robust feeling of drinking, excellent in sweetness in harmony with sourness, and has beer-like flavor. As used herein, the "robust feeling of drinking" means a feeling of touchiness or catchiness felt in the throat when swallowing a liquid. In addition, "sweetness in harmony with sourness" means sweetness that is not too strong as a beer taste while relaxing the stimulation accompanying sourness.

Means for Solving the Problems

The present invention provides a beer-taste fermented malt beverage containing a wort fermented liquid, having a real extract concentration of 3.5% (w/w) or more, and an alcohol concentration of less than 1% (v/v).

In one embodiment, the sum of the concentrations of isomaltose, isomaltotriose and panose of the beer-taste fermented malt beverage is 4.0 mg/mL or more.

In one embodiment, the beer-taste fermented malt beverage contains an alcohol-removed wort fermented liquid.

In one embodiment, the apparent final degree of fermentation of the wort fermented liquid is 80% or less.

Also, the present invention provides a method for producing a beer-taste fermented malt beverage with an alcohol concentration of less than 1% (v/v), the method comprising: a step of yeast-fermenting transglucosidase-treated wort containing 20% by weight or more of non-assimilable saccharides based on the total amount of saccharides to obtain a wort fermented liquid having an apparent final degree of fermentation of 80% or less; and a step of reducing the alcohol concentration to less than 1% (v/v) by removing alcohol from the wort fermented liquid.

In one embodiment, the real extract concentration of the beer-taste fermented malt beverage is 3.5% (w/w) or more.

In one embodiment, the sum of the concentrations of isomaltose, isomaltotriose and panose in the beer-taste fermented malt beverage is 4.0 mg/mL or more.

Effect of the Invention

The beer-taste fermented malt beverage with an alcohol concentration of less than 1% (v/v) of the present invention is excellent in robust feeling of drinking, excellent in sweetness in harmony with sourness, and has beer-like flavor.

DESCRIPTION OF EMBODIMENTS

The beer-taste fermented malt beverage of the present invention may be produced according to a method for producing a beer-taste fermented malt beverage with an alcohol concentration of less than 1% (v/v) using malt as a raw material, wherein transglucosidase is added to the maische containing malt to saccharify the maische.

The transglucosidase used in the present invention is not particularly limited as long as it is an enzyme having catalytic activity for a glycosyl transfer reaction, and transglucosidases derived from various organisms may be used. For example, any enzyme of the commercially available transglucosidases may be used, or these may be used in combination.

The addition of transglucosidase to maische is not particularly limited as long as a timing when the enzymatic reaction, with the transglucosidase added within the preparation step, is sufficiently carried out. For example, transglucosidase may be added together with a fermentation raw material such as malt when the maische is prepared, or may be added in the way of the saccharifying reaction. In the present invention, in order to sufficiently proceed the enzymatic reaction with transglucosidase, it is preferred that the transglucosidase is added at the time of preparing the maische or at an early stage of the preparation step, and it is more preferred that it is added at the time of preparing the maische.

For example, by first, crushed malt, auxiliary raw materials such as barley, and warm water are placed into a preparation tank and mixed to prepare maische. The preparation of the maische may be performed by a conventional method. For example, first, by holding at 35 to 60° C. for 20 to 90 minutes, proteins derived from raw materials is decomposed into amino acids and the like, and then, a saccharifying step is conducted. At this stage, as necessary, an enzyme such as transglucosidase, and flavor components such as spices and herbs, and the like may be added other than the main raw materials and the auxiliary raw materials.

Then, by gradually raising the temperature of the maische and holding it at a predetermined temperature for a certain period of time, starchy component is saccharified by utilizing an enzyme derived from malt and an enzyme added to the maische. The temperature and time during the saccharifying treatment may be appropriately determined in consideration of the type of enzyme used, the amount of maische, the quality of the intended wort fermented liquid, and the like, which may be carried out by holding it, for example, at 60 to 72° C. for 30 to 90 minutes. After the saccharifying treatment, the maische is held at 76 to 78° C. for about 10 minutes, and then filtered in a wort filtration tank to obtain a transparent saccharide liquid. Further, when performing the saccharifying treatment, an appropriate amount of the enzyme may be added within a necessary range.

Raw materials to be saccharified contain malt. The malt use ratio in raw materials to be saccharified is not particularly limited, but is 25% or more, preferably 50% or more, and more preferably 67% or more. The raw materials to be saccharified may be 100% malt. The ratio (%) of malt based on all raw materials except water is referred to as a malt use ratio. In general, the higher the malt use ratio, the stronger the malt-derived umami, richness and robust feeling of drinking of the obtained wort.

Auxiliary raw materials mean raw materials other than malt and hops. Examples of the auxiliary raw materials are starchy raw materials such as barley, wheat, corn starch, corn grits, rice, and Kaoliang, and saccharide raw materials such as liquid sugar and sugar. Here, the liquid sugar is produced by decomposing and saccharifying starchy component with an acid or a saccharifying enzyme, and mainly contains glucose, maltose, maltotriose and the like. In addition, spices, herbs, fruits and the like used for the purpose of imparting or improving flavor are also included in the auxiliary raw materials.

The saccharifying enzyme means an enzyme for decomposing starchy component into saccharide. As the saccharifying enzyme, there are, for example, $\alpha$-amylase, glucoamylase, pullanase and the like.

Wort boiling operation may be carried out according to the method and conditions which are commonly carried out when producing beer. For example, a saccharide liquid, the pH of which has been adjusted, is transferred to a boiling kettle, and boiled. During the time from the start of boiling of the saccharide liquid until being left to stand, hops are added in a whirlpool. Hop extract component or a component extracted from hops may be used as the hops. The saccharide liquid is then transferred to a precipitation tank called a whirlpool. After hops lees and curdled protein, produced by boiling, are removed, the resulting liquid is cooled to an appropriate fermentation temperature by a plate cooler. Transglucosidase-treated wort is obtained by operations up to the above wort boiling.

Non-assimilable saccharides mean saccharides that yeast does not use as nutrient sources for alcoholic fermentation and the like. The beer yeast used in the present invention assimilates glucose, fructose, maltose, and maltotriose. Therefore, saccharides other than these are collectively referred to as non-assimilable saccharides. Specific examples of the non-assimilable saccharides contained in the transglucosidase-treated wort include isomaltose, isomaltotriose, panose, oligosaccharides having 4 or more saccharides, and non-assimilable polysaccharides. The non-assimilable saccharides remain even after undergoing a fermentation step and an alcohol removal step described below.

The amount of transglucosidase used in producing maische is appropriately adjusted so that the amount of non-assimilable saccharides in the wort is within the above range in consideration of the type and reaction conditions. Generally, it is 0.05 to 20 g/kg, preferably 0.1 to 7 g/kg, and more preferably 0.25 to 5 g/kg based on the solid content of maische.

The obtained transglucosidase-treated wort is fermented by yeast. Fermentation of wort may be carried out according to the conventional method. For example, beer yeast is inoculated into cooled wort, and transferred to a fermentation tank to carry out alcoholic fermentation.

The apparent final degree of fermentation of the wort fermented liquid is preferably 80% or less. When the apparent final degree of fermentation of the wort fermented liquid exceeds 80%, the robust feeling of drinking of the obtained beer-taste beverage tends to be insufficient and the sourness tends to be strong. The apparent final degree of fermentation of the fermented wort liquid of the present invention is preferably 45 to 80%, and more preferably 50 to 75%.

The degree of fermentation is an important index which indicates to what extent fermentation has progressed in beer after fermentation, i.e., the progress of fermentation. Further, the final degree of fermentation means the ratio of the extract component that can be assimilated by beer yeast based on the raw wort extract component. Here, the extract component that can be assimilated by beer yeast is what is obtained by subtracting an extract component contained in the produced beer (that is, an extract component remaining after fermenting all the extract components that can be used by beer yeast (referred to as a final extract component)) from the raw wort extract component. The apparent final degree of fermentation means the final degree of fermentation which is calculated by using, as the value of the final extract component, the apparent extract component, that is, the extract concentration (% (w/w)) derived from the specific gravity of alcohol-containing beer.

The extract component means the non-volatile solid component. The term extract component means the non-volatile solid component itself, the amount of the non-volatile solid component, or the concentration of the non-volatile solid component depending on the context.

The apparent final degree of fermentation Vend of the wort fermented liquid may be obtained by, for example, the following formula (1).

$$V\text{end (\%)} = \{(P-\text{End})/P\} \times 100 \qquad (1)$$

wherein P is a raw wort extract component and Eend is an apparent final extract component.

The raw wort extract component P is the theoretical wort extract component value before alcoholic fermentation, which is back calculated from the alcohol concentration and the extract component value of the produced beer according to Balling's formula. Specifically, it may be obtained by the method shown in Analytica-EBC (9.4) (2007). In addition, the apparent final extract component Eend may be determined by collecting beer in a flask, adding a large amount of fresh pressed yeast, fermenting the mixture at 25° C. while stirring until the extract component value does not decrease any more (24 hours), and measuring the apparent extract component value in the remaining beer.

The apparent final extract component Eend may show a negative value because it is calculated from the alcohol-containing specific density of the final extract component. As a result, the apparent final degree of fermentation may exceed 100%.

The apparent final degree of fermentation may be controlled by adjusting, for example, the saccharifying conditions, whether or not the enzyme is used when saccharifying the raw material, the type and blending amount of the raw material, and the like. For example, the apparent final degree of fermentation may be reduced by reducing the amount of assimilable saccharides contained in maische.

After completion of the fermentation, furthermore, the obtained wort fermented liquid is matured as a maturing process in a liquor storage tank, stored under a low temperature condition of about 0° C., and stabilized. Next, as a filtration step, yeast, proteins and the like are removed by filtering the wort fermented liquid after maturation.

From the wort fermented liquid, from which yeast, protein and the like have been removed, carbon dioxide gas contained therein is removed as necessary. In addition, the wort fermented liquid is subjected to an alcohol-removing step to remove alcohol contained therein. The alcohol-removing step is carried out until the alcohol concentration of the wort fermented liquid is, for example, less than 1% (v/v), preferably less than 0.5% (v/v), and more preferably less than 0.1% (v/v). The alcohol-removing step is carried out using a conventionally known method. For example, a vacuum distillation method may be used. In this case, it is preferred to employ a method in which flavor components produced in the alcoholic fermentation process are allowed to remain therein.

The alcohol-removed wort fermented liquid preferably has a real extract concentration of 3.5% (w/w) or more. If the real extract concentration of the alcohol-removed wort fermented liquid is less than 3.5% (w/w), it becomes difficult to properly adjust the extract concentration of the obtained beer-taste beverage, and as a result, the robust feeling of drinking tends to be insufficient, and the sourness tends to be strong. The real extract concentration of the alcohol-removed wort fermented liquid is preferably 3.5 to 10.0% (w/w), and more preferably 4.0 to 7.5% (w/w).

The real extract concentration means the concentration % (w/w) of the non-volatile solid component. The real extract concentration of beer-taste fermented malt beverages may be measured, for example, by the EBC method (BCOJ Beer Analysis Method, 7.2 (2004), edited by the Beer Brewery Association).

The alcohol-removed wort fermented liquid contains isomaltose, isomaltotriose and panose at a total concentration of 4.0 mg/mL or more. If the above concentration is less than 4.0 mg/mL, the robust feeling of drinking of the beer-taste fermented malt beverage tends to be insufficient, and the sourness tends to be strong. The above concentration of the alcohol-removed wort fermented liquid is preferably 6.0 to 25.0 mg/mL, and more preferably 10.0 to 23.0 mg/mL.

The concentrations of isomaltose, isomaltotriose, and panose contained in the alcohol-removed wort fermented liquid may be measured by using, for example, a high performance liquid chromatograph (HPLC) or a high performance liquid chromatograph-mass spectrometer (UHPLC-MS/MS).

A pH adjusting agent is added to the alcohol-removed wort fermented liquid to lower the pH as necessary. By sufficiently lowering the pH, bacteriostatic properties required for marketing the beverage is imparted, and the beer-taste fermented malt beverage of the present invention is obtained. The beer-taste fermented malt beverage of the present invention may have a low pH to such an extent that the spoilage prevention effect is obtained. The specific upper limit of the pH is less than 4.2, preferably less than 4.1, and more preferably less than 4.0. On the other hand, the specific lower limit of the pH is 3.0 or more, preferably 3.3 or more, and more preferably 3.6 or more.

The types of pH adjusting agents are not limited. Acids, which are food additives and which may be used for beverages, foods or production process thereof, salts thereof, and beer raw materials having pH lowering ability may be used as the pH adjusting agents. Examples of the beer raw materials having pH lowering ability include sour malt, dark malt and the like. Preferred pH adjusting agents are phytic acid, citric acid, lactic acid, lactic acid bacteria, phosphoric acid, malic acid, sulfurous anhydride, tartaric acid, gluconic acid, acetic acid, succinic acid, adipic acid, itaconic acid, fumaric acid and combinations thereof. More preferred pH adjustors are phytic acid, lactic acid, lactic acid bacteria, phosphoric acid, malic acid, sulfurous anhydride, tartaric acid and combinations thereof. Considering the effect on the flavor of beer-taste beverages, phytic acid, which has less sourness among these, is most preferred.

A bitter substance is added to the alcohol-removed wort fermented liquid as necessary to adjust the bitterness value. Isolated iso-α acids may be used as the bitter substance. The iso-α acids are contained in hops, and it may also be employed as hops or a hop extract component. The hops or hop extract component means hop leaves, a ground product thereof, an extraction liquid obtained by extracting these with water or boiling water, a concentrate and a dried product of the extraction liquid.

The bitterness value of beer-taste beverages is adjusted to have a bitterness equivalent to beer. Specifically, the bitterness value of the beer-taste beverage is adjusted to 5 to 100 BU, preferably 10 to 35 BU, and more preferably 15 to 27 BU. The bitterness value of beer-taste beverages may be measured by the method described in BCOJ Beer Analysis Method, edited by the Beer Brewery Association, 8.15 (2004).

Carbon dioxide gas is added to the alcohol-removed wort fermented liquid by a carbonation step. That results in obtaining the beer-taste fermented malt beverage of the present invention. The amount of carbon dioxide gas added is adjusted so that it has the same foaming property as beer. Specifically, the amount of carbon dioxide added is adjusted so as to be 1.2 to 5.0 gas volumes, preferably 2.4 to 3.5 gas volumes, and more preferably 2.6 to 3.2 gas volumes.

The beer-taste fermented malt beverage of the present invention contains an extract component derived from the wort fermented liquid at a concentration of 3.5% (w/w) or more. If the concentration of the extract component derived from the wort fermented liquid is less than 3.5% (w/w), the robust feeling of drinking of the beer-taste fermented malt beverage tends to be insufficient and the sourness tends to be strong. The concentration of the extract component derived from the wort fermented liquid of the beer-taste fermented malt beverage is preferably 3.5 to 10.0% (w/w), and more preferably 4.0 to 7.5% (w/w).

The beer-taste fermented malt beverage of the present invention contains isomaltose, isomaltotriose and panose at a total concentration of 4.0 mg/mL or more. If the above concentration is less than 4.0 mg/mL, the robust feeling of drinking of the beer-taste fermented malt beverage tends to be insufficient and the sourness tends to be strong. The above concentration of the beer-taste fermented malt beverage is preferably 6.0 to 25.0 mg/mL, and more preferably 10.0 to 23.0 mg/mL.

The present invention will be described in more detail with reference to the following examples, but the present invention is not limited to these. In the examples, the units of concentration and content are based on weight unless otherwise specified.

EXAMPLES

Example 1

[Production Method of Beer-Taste Fermented Malt Beverage]

Crushed malt, warm water, and transglucosidase ("Transglucosidase L" manufactured by Amano Co., Ltd.) were placed into a preparation kettle, and protein was decomposed at around 55° C. The liquid was transferred from the preparation kettle to a preparation tank, and saccharifying was performed at a temperature in the range of 60 to 76° C. This saccharified liquid was filtered with a lauter that was a filter tank, then transferred to a boiling kettle, hops were added, and boiled for 60 minutes. After boiling, warm water equivalent to the evaporated component was added, hot tub was removed in a whirlpool tank, followed by cooling to 8° C. using a plate cooler to obtain transglucosidase-treated wort. The addition amount of transglucosidase was 0.5% (w/w) for Test Liquid A, 0.15% (w/w) for Test Liquid B, 0.025% (w/w) for Test Liquid C with respect to the amount of malt used, and nothing was added to Test Liquid D.

Beer yeast was added to this transglucosidase-treated wort to conduct fermentation at around 10° C. for 7 days, after which the beer yeast was removed. The tank was changed, the resulting wort was matured for 7 days, then cooled to around −1° C. and stabilized for 14 days. Then, gas-removed water was added to dilute the raw wort extract component to 10% (w/w), followed by filtration using diatomaceous earth to obtain a wort fermented liquid.

The apparent final degree of fermentation of the obtained wort fermented liquid was measured according to a conventional method. As a result, Test Liquid A was 52%, Test Liquid B was 60%, Test Liquid C was 80%, and Test Liquid D was 86%.

Next, the obtained wort fermented liquid was sprayed into a gas-removing tank under a reduced pressure of about 90 mbar to remove carbon dioxide, followed by heating to about 50° C. using a plate cooler. Thereafter, it was brought into contact with water vapor heated to around 50° C. in a column at a reduced pressure of around 90 mbar to adsorb volatile components to the water vapor so that alcohol and volatile components are removed, thereby obtaining an alcohol-removed wort fermented liquid having an alcohol concentration of 0.02% (v/v).

Carbon dioxide gas was dissolved in the obtained alcohol-removed wort fermented liquid so as to be 2.9 gas volumes thereby obtaining a beer-taste fermented malt beverage.

The real extract concentration (% (w/w)) of the beer-taste fermented malt beverage was measured by using the EBC method.

The concentrations of isomaltose, isomaltotriose and panose in the beer-taste fermented malt beverage were measured by the following method. First, a decarbonated beer-taste fermented malt beverage was appropriately diluted with distilled water, filtered through a filter, and subjected to UHPLC analysis. The measurement conditions for UHPLC were as follows.

TABLE 1

| | |
|---|---|
| Measurement Instrument | UHPLC (Shimadzu Corporation, Nexera)-MS/MS (AB Sciex, API 3200) |
| Column | Hypercarb, 2.1 × 150 mm, 3 µm (Thermo Scientific) |
| Column Temperature | 80° C. (Tmax = 85° C.) |
| Mobile Phase | Liquid A: 10 mmol/L ammonium acetate/0.1% acetic acid aqueous solution |
| | Liquid B: methanol |

TABLE 1-continued

| | |
|---|---|
| Flow Rate | 0.2 mL/min |
| Gradient Conditions | 0 min · · · 0% B, 25 min · · · 3% B, 40 min · · · 18% B, 50 min · · · 25% B, 65 min · · · 80% B, 75 min · · · 80% B, 75.1 min · · · 0% B, 90 min 0% B |
| Ionization Conditions | ESI positive, CUR 20, CAD 3, IS 5500, TEM 300, GS1 70, GS2 60, ihe ON |
| Sample Amount | 10 μL |

[Sensory Evaluation Method]
Robust Feeling of Drinking:

Sensory evaluation was performed on these Test Liquids A to D. As evaluation items, the three items of robust feeling of drinking, harmony between sweetness and sourness, and beer-like flavor were set, and 10 trained panelists specialized in beer. They scored according to the criteria described below. The average score of all the panelists was used as the score for each evaluation item. The liquid temperature of the sample used for evaluation was around 4° C.

[Evaluation Items and Evaluation Criteria]
Robust Feeling of Drinking:

The feeling of touchiness or catchiness, which is felt in the throat when drinking, was evaluated as a "robust feeling of drinking". Beer manufactured by Asahi Breweries, Ltd. "Asahi Super Dry" (trade name) was given 5 points, and water was given 1 point, scored on a 5-levels scale.

Harmony Between Sweetness and Sourness:

The sweetness that relaxes stimulation accompanying sourness, and that is not too strong as a beer taste was evaluated as "harmony between sweetness and sourness". Beer manufactured by Asahi Breweries, Ltd. "Asahi Super Dry" (trade name) was given 5 points, and water was given 1 point, scored on a 5-levels scale.

Beer-Like Flavor:

Regarding "beer-like flavor", beer manufactured by Asahi Breweries, Ltd. "Asahi Super Dry" (trade name) was given 5 points, and water was given 1 point, scored on a 5-levels scale.

Palatability:

When the "robust feeling of drinking", "harmony between sweetness and sourness" and "beer-like flavor" all had a score of 3.0 or higher, "palatability" was rated as "A" and the others were rated as "B".

The invention claimed is:

1. A beer-taste fermented malt beverage containing a wort fermented liquid, wherein:
    the beer-taste fermented malt beverage has a real extract concentration of 5.8% (w/w) or more, an alcohol concentration of less than 1% (v/v), and a total concentration of isomaltose, isomaltotriose and panose of 4.0 mg/mL or more,
    the wort fermented liquid is an alcohol-removed wort fermented liquid obtained by an alcohol-removing step of removing alcohol via a vacuum distillation method from a wort fermented liquid that is obtained by yeast-fermenting a transglucosidase-treated wort;
    the alcohol-removing step is carried out until an alcohol concentration of the wort fermented liquid is less than 1% (v/v); and
    an apparent final degree of fermentation of the wort fermented liquid is 45 to 80%.

2. The beer-taste fermented malt beverage according to claim 1, wherein the wort fermented liquid has a real extract concentration of 3.5 to 10% (w/w).

3. The beer-taste fermented malt beverage according to claim 1, wherein the total concentration of isomaltose, isomaltotriose and panose is 6.0 to 25.0 mg/mL.

4. The beer-taste fermented malt beverage according to claim 1, wherein raw materials of the wort has a malt use ratio of 25% or more.

5. The beer-taste fermented malt beverage according to claim 1, wherein a ratio of the total concentration of isomaltose, isomaltotriose and panose based on the real extract concentration is 2.5 to 5.75.

6. The beer-taste fermented malt beverage according to claim 1, having a pH of 3.0 to less than 4.2.

7. The beer-taste fermented malt beverage according to claim 1, wherein the alcohol-removing step is carried out until the alcohol concentration of the wort fermented liquid is less than 0.5% (v/v).

TABLE 2

| | Item | Test Liquid A | Test Liquid B | Test Liquid C | Test Liquid D |
|---|---|---|---|---|---|
| Analytical value | Real extract concentration (% (w/w)) | 5.8 | 5.1 | 3.6 | 3.1 |
| | Alcohol concentration (% (v/v)) | 0.02 | 0.02 | 0.02 | 0.02 |
| | (a) Isomaltose concentration (mg/mL) | 7.7 | 4.5 | 1.0 | 0.5 |
| | (b) Panose concentration (mg/mL) | 7.5 | 11.7 | 3.4 | 0.6 |
| | (c) Isomaltotriose concentration (mg/mL) | 2.8 | 0.7 | N. D. | N. D. |
| | Sum of (a) to (c) (mg/mL) | 18.0 | 16.9 | 4.4 | 1.0 |
| Sensory evaluation | Robust feeling of drinking | 4.2 | 4.0 | 3.5 | 2.4 |
| | Harmony between sweetness and sourness | 3.0 | 3.5 | 3.5 | 2.2 |
| | Beer-like flavor | 3.5 | 4.2 | 4.4 | 4.2 |
| | Palatability | A | A | A | B |

8. The beer-taste fermented malt beverage according to claim 1, wherein the alcohol-removing step is carried out until the alcohol concentration of the wort fermented liquid is less than 0.1% (v/v).

9. The beer-taste fermented malt beverage according to claim 1, having a pH of 3.0 to less than 4.1.

10. The beer-taste fermented malt beverage according to claim 1, having a pH of 3.0 to less than 4.0.

* * * * *